Patented Nov. 28, 1939

2,181,468

UNITED STATES PATENT OFFICE 2,181,468

MANUFACTURE OF STEEL

John Charles Witherspoon, Donora, Pa., assignor to The American Steel and Wire Company of New Jersey, a corporation of New Jersey No Drawing. Application April 15, 1938, Serial No. 202,355

2 Claims. (Cl. 75—54)

This invention is a steel producing process, one of the objects being to produce low-metalloid steel in a basic open-hearth furnace without necessarily resorting to the large ore additions and high furnace temperatures heretofore required to further drop the carbon content of the metal bath below the point where the carbon elimination rate becomes desirably slow.

In explanation of the above, when a ferrous carboniferous bath is in the course of refinement in an open-hearth furnace using a basic slag, the carbon elimination rate proceeds at an economically practical speed until the carbon in the bath drops to around .10 per cent., it being understood that the slag contains iron oxide which enters the bath and combines with the carbon in the same to produce carbon-oxide gases which carry away the carbon, and that the point at which the carbon elimination rate becomes undesirably slow is necessarily somewhat uncertain.

When this point is reached, which is generally in the neighborhood of .10 per cent. of carbon, it is prior art practice to make large additions of iron oxide in the form of ore and to resort to higher furnace temperatures to further eliminate the carbon. Even with this procedure the carbon elimination rate proceeds rather slowly. Obviously, some improvement is desirable.

According to this invention, a molten ferrous bath containing carbon is contacted with a basic slag containing iron oxide, this being carried out by means of an open-hearth furnace. The slag contains silica and lime in addition to iron oxide, and the lime to silica ratio of the slag is maintained sufficiently high to assure that its iron oxide content substantially exceeds its silica content until, or at the time, the rate of carbon elimination from the bath becomes undesirably slow.

At this time silica, which may be in the form of brickbats, is added to the slag in sufficient quantities to materially increase the silica content of the slag to effect rapid removal of carbon from approximately 0.10 per cent. to a minimum of 0.04 per cent. as desired. About forty pounds of brickbats per ton of ingot steel accomplishes this purpose in the case of plain carbon steel. After the addition of the silica the furnace temperature is maintained at around 3000 degrees Fahrenheit or less, the furnace being tapped about from fifteen to twenty-five minutes after the addition of the silica. This time factor is necessarily variable because it depends upon the carbon drop required to meet the specifications of the steel. However, in all cases, the time is much shorter than that required by the prior art practice, and it is not necessary to resort to the higher furnace temperatures required by that practice. Therefore, the desired object is obtained.

In some instances it has been prior art practice to add brickbats early in the heat for the purpose of ending with a low iron oxide slag. This practice cannot be followed in the case of the present invention for the reason that the silica content would greatly exceed the iron oxide content at the time the rate of carbon elimination slows.

The carbon elimination rate proceeds at a practical speed until the carbon in the bath is reduced to .10 per cent., and it is at this time that the silica should be added in the case of the present invention, it being remembered that the lime to silica ratio of the slag must be adjusted to produce a high iron oxide slag at this time. However, it may in some instances be desirable to add the silica to the slag when the carbon is reduced in the bath to around .15 per cent., since further carbon elimination is ordinarily slower than is desirable.

Generally speaking, the time the silica should be added is when the carbon elimination rate becomes so slow as to be undesirable in the judgment of those in charge of the furnace. At this time, the addition of silica will produce a marked acceleration in the carbon elimination rate, providing the lime to silica ratio has been maintained sufficiently high to then assure a high iron oxide slag.

I claim:
1. A method of working a basic open-hearth steel furnace, characterized by regulating the slag so its iron oxide content substantially exceeds its silica content when the carbon in the bath has dropped to around .15 per cent. and then adding silicious material to effect a further carbon drop.

2. A method of producing low-metalloid steel in a basic open-hearth furnace, characterized by regulating the slag on the bath in the furnace so that when the carbon content of the bath is reduced to around .10 per cent. the iron oxide content of the slag substantially exceeds the silica content of the slag, and at that time adding sufficient silicious material to the slag to drop the carbon content of the bath to a carbon content within the range of low-metalloid steel in not more than twenty-five minutes when operating at furnace temperatures of 3000 degrees Fahrenheit or less.

JOHN CHARLES WITHERSPOON.